United States Patent
Shaffer et al.

(10) Patent No.: US 7,046,636 B1
(45) Date of Patent: May 16, 2006

(54) SYSTEM AND METHOD FOR ADAPTIVELY IMPROVING VOICE QUALITY THROUGHOUT A COMMUNICATION SESSION

(75) Inventors: Shmuel Shaffer, Palo Alto, CA (US); Robert E. Gleichauf, San Antonio, TX (US); Robert T. Bell, Bountiful, UT (US); Joseph F. Khouri, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 925 days.

(21) Appl. No.: 09/996,097

(22) Filed: Nov. 26, 2001

(51) Int. Cl.
   *H04J 1/16* (2006.01)

(52) U.S. Cl. .................. 370/252; 370/352; 370/356; 370/401

(58) Field of Classification Search .......... 370/252, 370/356, 401, 259, 390, 389, 235, 357, 471, 370/395.32
   See application file for complete search history.

(56) References Cited

U.S. PATENT DOCUMENTS

| | | | |
|---|---|---|---|
| 5,774,837 A | 6/1998 | Yeldener et al. | 704/208 |
| 5,794,183 A | 8/1998 | Müller et al. | 704/222 |
| 6,240,386 B1 | 5/2001 | Thyssen et al. | 704/220 |
| 6,466,574 B1 * | 10/2002 | Fujisaki et al. | 370/356 |
| 6,512,746 B1 | 1/2003 | Sand | 370/252 |
| 6,651,207 B1 | 11/2003 | Dicker et al. | 714/746 |
| 6,741,569 B1 * | 5/2004 | Clark | 370/252 |
| 6,760,312 B1 | 7/2004 | Hitzeman | 370/252 |
| 6,823,303 B1 | 11/2004 | Su et al. | 704/220 |
| 6,856,601 B1 * | 2/2005 | Bell et al. | 370/252 |

* cited by examiner

*Primary Examiner*—Chi Pham
*Assistant Examiner*—Alexander O. Boakye
(74) *Attorney, Agent, or Firm*—Baker Botts L.L.P.

(57) ABSTRACT

A method for adaptively improving voice quality during a communication session includes monitoring voice quality parameters associated with a communication session at one or more network components of a communication network. At least one of the network components is selected to perform packet replication, if a value of the voice quality parameters deviates from a predetermined range. In accordance with a particular embodiment, replicated packets are transmitted from the selected network component along an alternate communication path. In accordance with another embodiment, an improvement in performance associated with transmission of the replicated communication packets along the alternate communication path is assessed. Transmission of the replicated communication packets may be discontinued if the improvement is below a predetermined minimum.

37 Claims, 3 Drawing Sheets

SYSTEM AND METHOD FOR ADAPTIVELY IMPROVING VOICE QUALITY THROUGHOUT A COMMUNICATION SESSION

TECHNICAL FIELD OF THE INVENTION

The present invention relates generally to network communications and more particularly, to a system and method for adaptively improving voice quality throughout a communication session.

BACKGROUND OF THE INVENTION

Telephones and other communications devices for sending audio information through the public switched telephone network (PSTN) have existed for a substantial period of time and are well understood. Recently, however, telephones have been created that exchange audio information through packets switched networks such as the Internet. These telephones use a digitized format that breaks down audio information into discrete Internet protocol (IP) packets. These voice over IP (VoIP) are sent and received through the packet switched network.

Exchanging audio information through a packet switched network presents a variety of problems. For example, errors in the packet transmission may result in echo, scratchy audio, dropped calls, delay and/or jitter in the audio string. As long as the fullest quality of VoIP is perceived to be inferior to the voice quality of traditional telephony systems, users will remain reluctant to employ VoIP systems.

Packet replication is a known technique for reducing the probability of packet loss and for reducing jitter associated with packet time of arrival. Packet replication may be invoked at the edge of a communication network where voice packets enter or exit the network. As the number of replication points increases, the load in the network increases, thus, adversely impacting the overall performance of the network. Points in the network where replication takes place are static.

As a given packet is replicated and sent via different communication paths, the resulting voice quality increases up through a certain number of duplications. Continuing to replicate the voice packets beyond this number will increase congestion in the network while providing only marginal improvements and voice quality, if any.

SUMMARY OF THE INVENTION

The present invention solves many of the problems and disadvantages associated with prior communication systems. In a particular embodiment, the present invention provides a system and method for monitoring voice quality parameters at a plurality of network components, and adaptively selecting one or more of the network components to perform packet replication, as needed to improve voice quality.

In a particular embodiment, a method for selecting one of a plurality of network components to perform packet replication during a communication session includes receiving a first plurality of communication packets of a communication session between two endpoints. Communication packets are transmitted along a communication path, which includes a plurality of network components. Performance parameters associated with the communication session are monitored at one of the two endpoints. Values of the performance parameters are compared with a predetermined threshold value. Performance parameters are monitored at at least one of the plurality of network components, if the performance parameter monitored at the one of the two endpoints is below the threshold value.

In accordance with a particular embodiment, one or more of the plurality of network components are selected to perform packet replication along an alternate communication path, based on the performance parameter monitored at the at least one of the plurality of network components.

In another embodiment, a second plurality of communication packets of the communication session are replicated at the one or more of the plurality of network components. The replicated communication packets may be transmitted along the alternate communication path.

In yet another embodiment, an improvement in performance associated with transmission of the replicated communication packets along the alternate communication paths is assessed. The transmission of the replicated communication packets along the alternate communication paths is discontinued if the improvement in performance is below a predetermined minimum.

In still another embodiment, a method for adaptively improving voice quality during a communication session includes monitoring voice quality parameters associated with a communication session at one or more network components of a communication network. At least one of the network components is selected to perform packet replication if a value of the voice quality parameters deviates from a predetermined range. The replicated packets may be transmitted from the selected at least one of the network components along an alternate communication path.

Technical advantages of particular embodiments of the present invention include a system and method for automatically measuring and analyzing voice related parameters (e.g., number of packets in the jitter buffer, packet time of arrival, network congestion, dropped packets, latency, etc.) at endpoints of a communication session. Accordingly, an accurate measurement of voice quality as perceived by end users may be provided.

Another technical advantage of the present invention includes a system and method for automatically triggering collection and analysis of voice parameters in the network in order to identify and isolate the source of voice quality degradation. The parameters may be collected and analyzed at all network components, or less than all network components. This allows the system to identify voice quality degradation, as well as isolate the source of the degradation.

Yet another technical advantage of the present invention includes a system and method for automatically initiating packet replication in response to voice quality degradation. The packet replication may be invoked in a network component ahead of the source of voice quality degradation, in order to overcome the degradation. Accordingly, voice quality for each communication session may be analyzed, and specific network components may be instructed to replicate voice packets associated with a given communication session, in order to overcome voice degradation.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of the present invention and its advantages, reference is now made to the following descriptions, taken in conjunction with the accompanying drawings, in which.

DETAILED DESCRIPTION OF THE INVENTION

Figure 1:
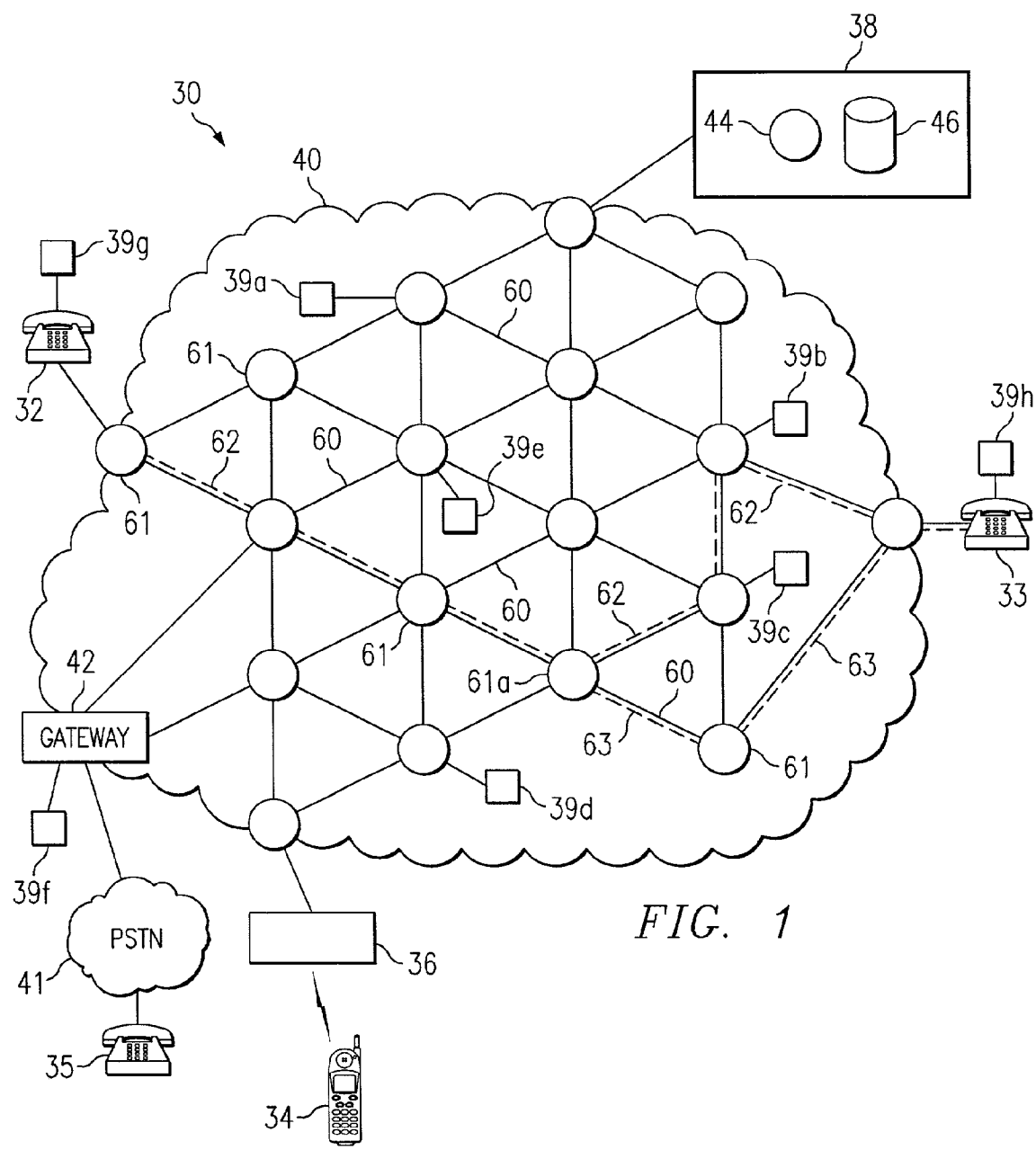
FIG. 1 illustrates one embodiment of a communication system incorporating teachings of the present invention.

FIG. 1 illustrates a communication system 30 including a plurality of endpoints 32–35 having the ability to establish communication sessions with each other, using communication network 40, and/or additional endpoints, components or resources coupled with communication network 40. Communication network 40 includes a plurality of segments 60 and nodes 61 that couple endpoints 32–35 across communication network 40. Any given communication session between two of endpoint 32–35 will include the transfer of packets across one or more communication paths, each of which include a plurality of segments 60 and nodes 61. For illustrative purposes, a communication path 62 between endpoints 32 and 33 is shown in dotted lines.

A voice quality system 38 is coupled with network 40, and monitors voice quality associated with segments 60, nodes 61, and/or the endpoints included in the communication session. The voice quality system 38 may include one or more analyzers 39a–39g (collectively, analyzers 39), each of which may be coupled with a respective one of segments 60, nodes 61, gateway 42 and/or endpoints 32–35. Accordingly, voice quality parameters associated with the communication session may be monitored at one or more of segments 60, nodes 61, gateway 42, and/or endpoints 32–35.

In accordance with a particular embodiment of the present invention, voice quality is periodically measured at various locations of network 40 and attached components, in order to assess the overall voice quality of a communication session(s). If the voice quality deviates from a predetermined level, one or more of nodes 61 are instructed to replicate communication packets, and transmit the packets along an alternate communication path(s). This allows voice quality system 38 to adaptively redistribute replicated network traffic, in order to overcome sources of voice degradation at and one or more of segments 60, nodes 61 and/or endpoints 32–35.

Voice quality system 38 may attempt to reserve bandwidth along the alternate communication path(s), to ensure that sufficient bandwidth will be available to support the communication session(s). For example, the Resource Reservation Protocol (RSVP) may be used to reserve bandwidth along the alternate communication path(s). However, if RSVP reservations are not available (e.g., insufficient available bandwidth), then voice quality system 38 may drop the alternate communication path in favor of either the original communication path, or a new (third) communication path. The cycle of continuously identifying new, distinct communication paths with improved voice quality over the original communication path may continue until an alternate communication path having sufficient bandwidth to support the communication session is identified.

Endpoints 32–35 may be any combination of hardware, software, and/or encoded logic that provide communication services to a user. For example, endpoints 32–35 may include a telephone, a computer running telephony software, a video monitor, a camera, or any other communication hardware, software, and/or encoded logic that supports the communication of packets of media using communication network 40. In the illustrated embodiment, endpoints 32–34 include an internet telephone, a personal computer and a wireless handset, respectively. A wireless transmitter/receiver 36 couples endpoint 34 with communication network 40. Endpoints 32–35 may also include unattended or automated systems, gateways, other intermediate components, or other devices that can establish media sessions. Although FIG. 1 illustrates four endpoints 32–35, communication system 30 contemplates any number and arrangement of endpoints 32–35, segments, nodes, or other network components for communicating media.

In the illustrated embodiment, communication network 40 is a wide area network (WAN) that enables communication between a plurality of endpoints distributed across multiple cities and geographic regions. Communication network 41 is the public switched telephone network (PSTN) and couples a PSTN endpoint 35 with network 40.

Communication network 40 includes a plurality of segments 60 and nodes 61 that couple endpoints 32–34 across communication network 40. Nodes 61 may include any combination of network components, gatekeepers, call managers, routers, hubs, switches, gateways, endpoints, or other hardware, software, or embedded logic implementing any number of communication protocols that allow for the exchange of packets in communication system 30. Each segment 60 and the respective nodes 61 or other communication devices it couples include a finite capacity of network resources (e.g. bandwidth) available to a communication session between endpoints. At any given time, a portion of such network resources may be dedicated to one or more existing communication sessions and less than the entire capacity of network resources may be available for a particular communication session.

Although a specific communication network 40 is illustrated in FIG. 1, the term "communication network" should be interpreted as generically defining any network capable of transmitting audio and/or video tele-communication signals, data, and/or messages. Network 40 may be a local area network (LAN), wide area network (WAN), global distributed network such as the Internet, Intranet, Extranet, or any other form of wireless or wireline communication network. Generally, network 40 provides for the communication of packets, cells, frames, or other portions of information (generally referred to as packets) between endpoints 32–35. Network 40 may include any combination of segments 60, nodes 61, endpoints 32–35, or other network components.

In a particular embodiment, network 40 employs communication protocols that allow for the addressing or identification of endpoints 32–35 and/or gateway 42 coupled to network 40. For example, using Internet protocol (IP), each of the components coupled for communication of packets by network 40 in communication system 30 may be identified in information directed using IP addresses. In this manner, network 40 may support any form and/or combination of point-to-point, multicast, unicast, or other techniques for exchanging media packets among components in communication system 30. Although the subsequent description will primarily focus on IP telephony devices, it should be understood that other appropriate telephony devices, such as Voice over Frame Relay devices, are also included within the scope of this description.

Network 40 may be directly coupled to other IP networks including, but not limited to, the Internet. Since IP networks share a common method of transmitting data, telecommunication signals may be transmitted between telephony devices located on different, but interconnected, IP networks. In addition to being coupled to other IP networks, network 40 may also be coupled to non-IP telecommunication networks through the use of gateway 42. For example, network 40 is coupled to PSTN 41. PSTN 41 includes switching stations, central offices, mobile telephone switching offices, pager switching offices, remote terminals, and other related telecommunications equipment that are located across the country.

IP networks transmit data (including voice and video data) by placing the data in packets and sending each packet individually to the selected destination, along one or more communication paths. Unlike a circuit-switched network (like PSTN 41), dedicated circuits are not required for the duration of a call or fax transmission over IP networks. Instead, each telephony device sends packets across the network as they become available for transmission. This feature makes bandwidth available for other data when voice or fax data is not being transmitted.

The technology that allows telecommunications to be transmitted over an IP network may be referred to as Voice over IP (VoIP). In the illustrated embodiment, endpoints 32–34 are IP telephony devices. IP telephony devices have the capability of encapsulating a user's voice (or other inputs) into IP packets so that the voice can be transmitted over network 40. IP telephony devices may include telephones, fax machines, computers running telephony software, gateways, or any other device capable of performing telephony functions over an IP network.

Nodes 61 include hardware, software, and/or embedded logic operable to identify, control, count, and/or supervise the traffic or flow of packets through it. Nodes 61 also include terminal and gateway registration regarding components of network 40, address resolution, bandwidth control, admission control, etc. In general, nodes 61 perform network administrator functionality with regard to endpoints 32–34 and/or other components of network 40 under its control. In a particular embodiment, nodes 61 include call managers. In this embodiment, each node 61 is an application that controls call processing, routing, telephone features and options (such as call hold, call transfer, and caller ID), device configuration, and other telephony functions and parameters within communication network 40.

Voice quality system 38 may include any combination of hardware, software and/or embedded logic, and may be centrally located within a particular component of communication system 30, or distributed throughout one or more network components of communication system 30. In the illustrated embodiment, voice quality system 38 includes a processor 44 and a memory 46. Processor 44 may be a microprocessor, controller, or any other suitable computing device or resource. Memory 46 may be any form of volatile or nonvolatile memory including, without limitation, magnetic media, optical media, random access memory (RAM), read only memory (ROM), removable media, or any other suitable local or remote memory component. Voice quality system 38 also includes a plurality of analyzers 39, which also include processors and memory. System 38 is operable to monitor network performance in order to detect and alleviate voice quality degradation. Voice quality system 38 and/or analyzers 39 may include any number or configuration of processors and/or memory centrally located or distributed throughout communication system 30. The performance of voice quality system 38 will be described in more detail with regard to FIG. 2.

Analyzers 39 are coupled with respective nodes 61 and endpoints 32 and 35. The number and distribution of analyzers 39 may be significantly modified, within the teachings of the present invention. For example, all nodes 61 and endpoints 32–34 may include a respective analyzer. In another embodiment, analyzers 39 may be selectively distributed throughout the network in order to assess network performance at particular components and/or locations of the network. Analyzers 39 may be integral to ("built into") one or more network components, or analyzers 39 may be stand-alone device(s) throughout network 40.

During any given communication session between endpoint 32, for example, and endpoint 35, various communication paths are available for communicating data and information. Each communication path comprises a plurality of segments 60 and/or nodes 61. The particular communication path of a communication session depends, at least in part, upon network traffic being experienced by communication network 40 at the time of the communication session, the type of communication session, the bandwidth capacity of each segment 60 and/or node 61 included in the communication path, as well as the amount of bandwidth currently available to such segments 60 and nodes 61. Since each communication path includes a plurality of segments 60 and nodes 61, the segment 60 or node 61 of the communication path which has the least amount of bandwidth currently available will determine the overall capacity of a particular communication path. Several unique communication paths may be used during the same communication session, in order to transmit packets of the communication session. For example, packets of the same communication session may take alternate routes to arrive at the same destination endpoint.

Problems experienced at segments 60, nodes 61, and/or endpoints 32–35 may negatively impact the voice quality of a particular communication session. Factors which impact voice quality include dropped packets, jitter, echo, interference, static, network congestion, etc. The teachings of the present invention provide a system and method for identifying and correcting voice quality degradation of a communication session(s).

Figure 2:
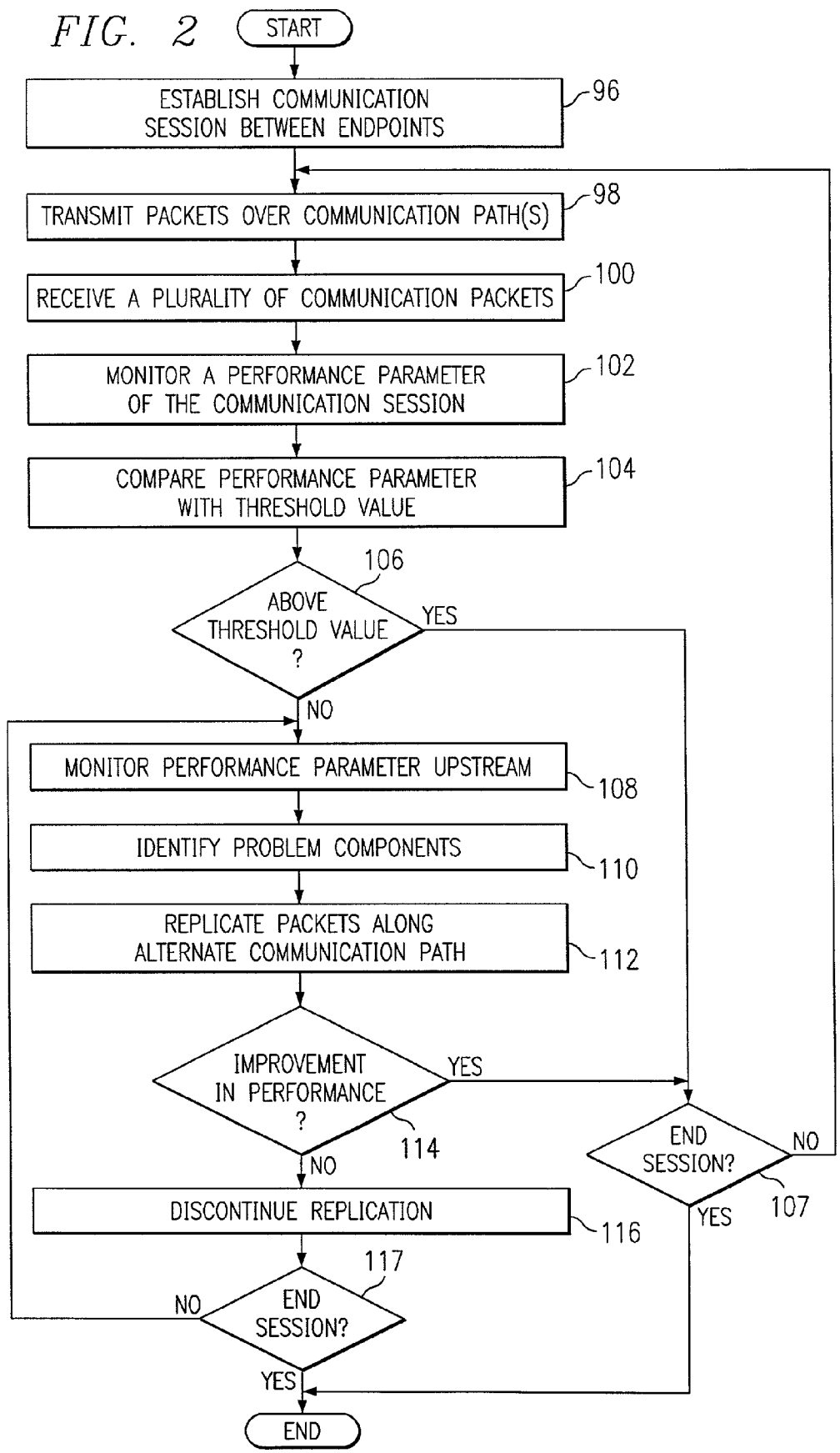
FIG. 2 illustrates a method for selecting one of a plurality of network components to perform packet replication, in accordance with another embodiment of the present invention.

FIG. 2 illustrates a method for selecting one of a plurality of network components to perform packet replication, in accordance with a particular embodiment of the present invention. The method will be described with regard to communication system 30 of FIG. 1. The method begins at step 96 where a communication session is established between two endpoints. For example, communication path 62 may be established between endpoints 32 and 33. Accordingly, at step 98, communication packets are transmitted along communication path 62, between endpoints 32 and 33. As described earlier, the communication packets that make up the communication session need not all travel along the same communication path throughout the communication session.

At step 100, a plurality of communication packets from the communication session are received at a network component coupled with an analyzer 39. The analyzer may be located anywhere within network 40, within the teachings of the present invention. For example, in the illustrated embodiment, analyzers 39g and 39h are coupled with endpoints 32 and 33, respectively. Therefore, packets received at endpoint 33 may be analyzed in order to detect a degradation in voice quality. In this manner, analyzer 39 is monitoring a performance parameter (e.g., voice quality parameter) of the communication session, at step 102. For example, analyzer 39h may keep track of the communication packets received and the respective times at which they are received, in order to determine whether or not they are received timely. In one embodiment, packets are received at endpoint 33 every 20 milliseconds. If a packet is dropped, then analyzer 39h will not receive a packet for 40 milliseconds. Therefore, analyzer 39h is able to detect dropped packets, which can cause a degradation in voice quality.

Jitter refers to a condition where the network provides various latency (i.e., different waiting times) between consecutive packets or cells. This is particularly disruptive to audio communications. If analyzer 39h detects latency in the receiving time of consecutive packets at endpoint 33, then analyzer 39h detects "jitter" in the communication session. As previously discussed, analyzer 39h may also be configured to detect echo, static, interference or other form of voice quality degradation at endpoint 33.

As analyzer 39h monitors the performance parameters, the results can be compared to a threshold value at step 104. For example, a threshold value may allow for one dropped packet every one minute, or one dropped packet in one thousand. Similarly, minimum or maximum values of network latency (jitter) may be established. For the purposes of this specification, threshold value may include a particular value, or a range of values.

If the performance parameter is at an acceptable level, (e.g., above (or within) the threshold level) at step 106, then the method determines whether the communication session is over (terminated), at step 107. If the communication session is no longer active, then the method ends. If the communication session is active, then the method continues to monitor the communication session, for example, by returning to step 98.

If analyzer 39h detects any form of voice quality degradation beyond the allowable threshold value (or level) at step 106, then voice quality system 38 attempts to find the source of the problem, in order to enhance the voice quality of the communication session. For example, once voice quality degradation is detected, another analyzer(s) 39 may be instructed to monitor voice quality parameters "upstream" of the point at which the degradation is detected, at step 108. In the illustrated embodiment of FIG. 1, for example, analyzer 39b and/or 39c may begin to monitor voice quality parameters (e.g., dropped packets, jitter, echo, etc.).

By continuously working upstream along the communication path(s), the source of the voice quality degradation may be identified at step 110. For example, voice quality system may determine that all segments 60 and nodes 61 are functioning properly, except for the node 60 which is directly connected with analyzer 39b. In this case, voice quality system 38 may direct node 61a to replicate packets of the communication session(s), and transmit them along an alternate communication path for example, communication path 63 (also shown in dotted lines), at step 112. This avoids the "problem" node coupled with analyzer 39b, and should increase the voice quality of the communication session. For the purposes of this specification, the term "primary communication path" may be used to identify the communication path along which the packets are originally being transmitted. The term "alternate communication path" may be used to identify the new communication path which is selected by voice quality system 38. The primary and alternate communication paths may share certain segments 60 and/or nodes 61 in common.

In accordance with a particular embodiment of the present invention, voice quality system 38 may be configured to continue monitoring the performance parameters of the communication session in order to detect any improvement in performance due to the replication, at step 114. If an improvement is identified and the performance is within a predetermined acceptable level, then the method returns to step 107 to determine whether the communication session is ongoing, as described above. However, if there is little or no improvement from the replication along the alternate path, the replication along the alternate path may be terminated at step 116. Next, at step 117, the method determines whether the communication session is still active, in a similar manner as step 107. If the communication session is over, the method ends. If the communication session is active, the method returns to step 108 and continues to monitor a performance parameter(s) upstream. This cycle may continue for the selection of any number of alternate communication paths, until the voice quality of the communication session is within an acceptable, predetermined value(s).

It will be recognized by those of ordinary skill in the art, that voice quality system 38 and/or analyzers 39 may be located anywhere within communication system 30. Furthermore, each of voice quality system 38 and analyzers 39 may be any hardware, software, or embedded logic that are stand alone systems, incorporated into one or more network components, or distributed throughout several network components.

Figure 3:
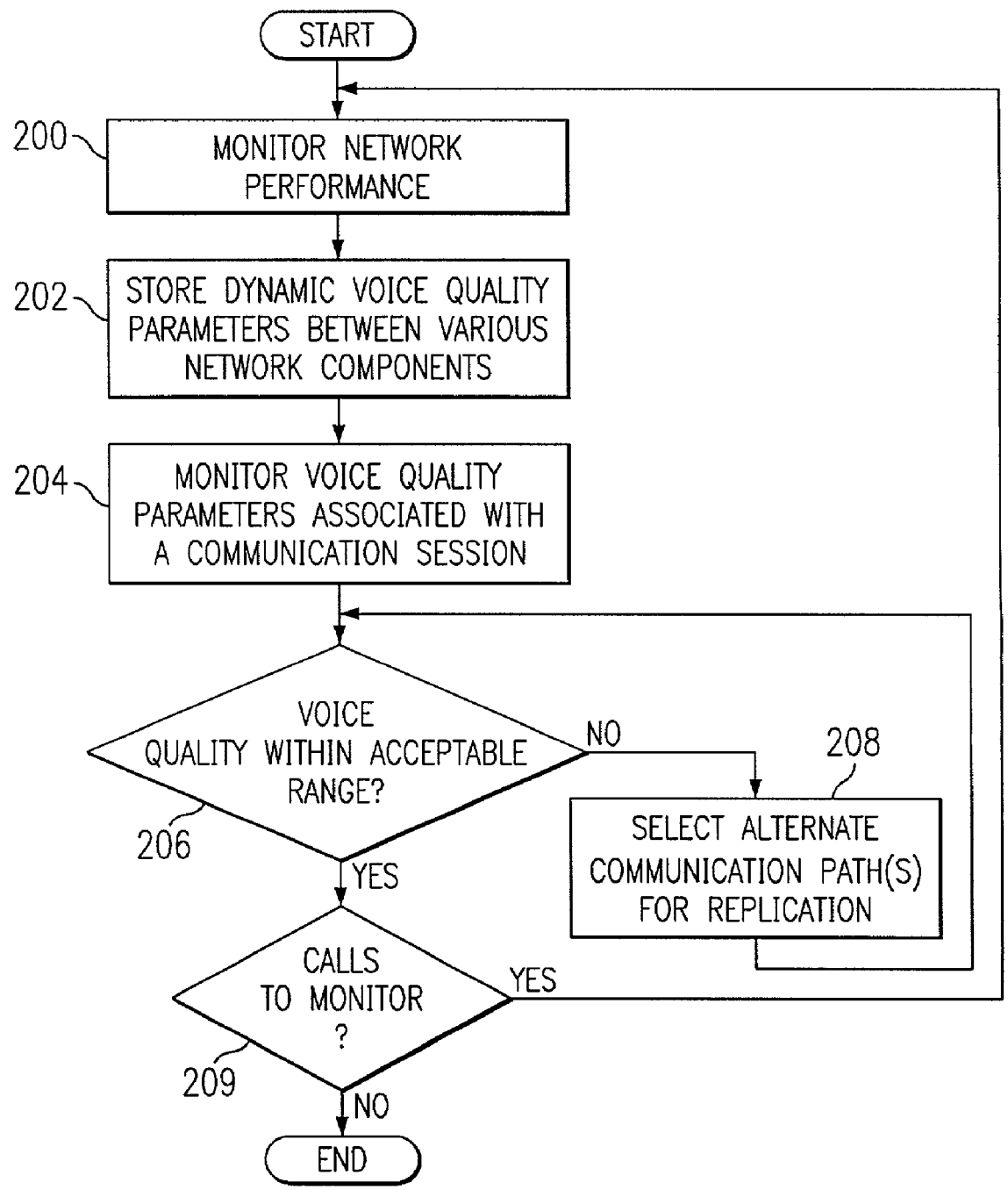
FIG. 3 illustrates a method for adaptively improving voice quality during a communication session.

FIG. 3 illustrates a method for adaptively improving voice quality during a communication session, in accordance with another embodiment of the present invention. The method begins at step 200, where voice quality system 38 monitors network performance at various network components. In this embodiment, the monitoring of network performance is not necessarily specific to a single communication session. Instead, voice quality system 38 continuously monitors communications between various network components in order to determine how specific components, segments 60, and/or nodes 61 are performing. The performance of such components, segments and nodes may be dynamically stored at step 202, for later retrieval by voice quality system 38, in case an alternate communication path is needed for a given communication session. The storage is referred to as dynamic, since the performance criteria regarding components, segments and/or nodes are updated periodically, to reflect changes in network traffic and performance of various components.

At step 204, voice quality system 38 monitors voice quality parameters regarding one or more communication sessions, to determine whether or not the voice quality is within an acceptable range of values. If the voice quality parameters of a communication session are within the acceptable range, the method determines whether there are additional calls (communication sessions) to monitor, at step 209. If there are additional calls to monitor, the method returns to step 200. If not, then the method ends.

If voice quality system 38 identifies a communication session with degraded voice quality, at step 206, then an alternate communication path is selected at step 208. In this manner, network components may be instructed to replicate packets along portions of the communication path, in an attempt to improve the voice quality of the communication session. Such replicated packets may then be transmitted along one or more alternate communication paths.

The alternate communication path(s) is selected at step 208. The alternate communication path(s) are selected according to the information collected at step 200 regarding the performance (or relative performance) of various communication paths, segments, nodes and/or other network components. In this manner, the voice quality system is able to compare performance parameters and data to determine which segments and nodes to include in an alternate communication path to achieve improved performance parameters of a communication session.

After replicating packets along an alternate communication path, voice quality system 38 monitors the performance parameters associated with the communication session to determine if there is sufficient improvement to bring the voice quality into the acceptable range. This cycle may be repeated, until an alternate path is identified that brings the voice quality parameters within an acceptable level.

Although the present invention has been described in several embodiments, a myriad of changes and modifications may be suggested to one skilled in the art, and it is intended that the present invention encompass such changes and modifications as fall within the scope of the present appended claims.

What is claimed is:

1. A method for adaptively improving voice quality during a communication session, comprising:
   monitoring voice quality parameters associated with a communication session at one or more network components along a primary communication path;
   selecting at least one of the network components to perform packet replication, if a value of the voice quality parameters deviates from a predetermined range;
   transmitting replicated packets from the selected at least one of the network components along an alternate communication path; and
   discontinuing the transmission of packets along the primary communication path and continuing the transmission of replicated packets along the alternate communication path.

2. A method for adaptively improving voice quality during a communication session, comprising:
   monitoring voice quality parameters associated with a communication session at one or more network components along a primary communication path;
   selecting at least one of the network components to perform packet replication, if a value of the voice quality parameters deviates from a predetermined range;
   transmitting replicated packets from the selected at least one of the network components along an alternate communication path; and
   reserving bandwidth along the alternate communication path to accommodate the communication session if the bandwidth is available.

3. The method of claim 2, further comprising discontinuing the transmission of packets along the alternate communication path if the bandwidth is not available.

4. A method for adaptively improving voice quality during a communication session, comprising:
   monitoring voice quality parameters associated with a communication session at one or more network components along a primary communication path;
   selecting at least one of the network components to perform packet replication, if a value of the voice quality parameters deviates from a predetermined range;
   transmitting replicated packets from the selected at least one of the network components along an alternate communication path;
   wherein the voice quality parameters are monitored periodically throughout the communication session; and
   wherein the alternate communication path is dynamically selected to achieve a voice quality within the predetermined range, throughout the communication session.

5. A method for selecting one of a plurality of network components to perform packet replication during a communication session, comprising:
   receiving a first plurality of communication packets of a communication session between two endpoints, the communication packets being transmitted along a primary communication path including a plurality of network components;
   monitoring a performance parameter associated with the communication session at one of the two endpoints;
   comparing values of the performance parameter monitored at the one of the two endpoints with a predetermined threshold value;
   monitoring the performance parameter at at least one of the plurality of network components, if the performance parameter monitored at the one of the two endpoints is below the threshold value; and
   selecting one or more of the plurality of network components to perform packet replication along an alternate communication path, based upon the performance parameter monitored at the at least one of the plurality of network components.

6. The method of claim 5, further comprising:
   replicating a second plurality of communication packets of the communication session at the one or more of the plurality of network components; and
   transmitting the replicated communication packets along the alternate communication path.

7. The method of claim 6, further comprising monitoring first and second voice qualities along the primary and replicated communication paths, respectively.

8. The method of claim 7, further comprising discontinuing transmission of communication packets along the primary communication path if the second voice quality along the alternate communication path exceeds the first voice quality along the primary communication path.

9. The method of claim 7, further comprising discontinuing transmission of communication packets along the alternate communication path if the first voice quality along the primary communication path exceeds the second voice quality along the alternate communication path.

10. The method of claim 5, further comprising:
    monitoring the performance parameter at more than one of the plurality of network components; and
    reporting results of the performance parameter monitoring at the more than one of the plurality of network components to a voice quality system.

11. The method of claim 10, further comprising:
    assessing an improvement in performance associated with transmission of the replicated communication packets along the alternate communication path; and
    discontinuing the transmission of the replicated communication packets along the alternate communication path, if the improvement in performance is below a predetermined minimum.

12. The method of claim 10, wherein the more than one of the plurality of network components comprises the one of the two endpoints.

13. The method of claim 10, wherein the more than one of the plurality of network components comprises a voice quality enhancement system.

14. The method of claim 5, wherein the performance parameter comprises jitter.

15. The method of claim 5, wherein the performance parameter comprises dropped packets.

16. The method of claim 5, wherein the performance parameter comprises echo.

17. The method of claim 5, wherein the performance parameter monitored at the one of the two endpoints comprises jitter, and wherein the one of the two endpoints also monitors at least one of dropped packets and echo.

18. The method of claim 5, wherein the performance parameter monitored at the at least one of the plurality of network components comprises jitter, dropped packets, or echo.

19. The method of claim 5, wherein the performance parameter monitored at the at least one of the plurality of network components comprises jitter, and wherein the at least one of the plurality of network components also monitors dropped packets and echo.

20. A system for adaptively improving voice quality during a communication session, comprising:
a plurality of network components being operable to receive and transmit communication packets associated with one or more communication sessions;
a voice quality system being operable to receive and analyze voice quality parameters associated with the one or more communication sessions, measured at one or more of the network components;
the voice quality system including a processor operable to analyze the voice quality parameters, and select at least one of the network components to perform packet replication if the voice quality parameters deviate from a predetermined range.

21. The system of claim 20, wherein the voice quality system is further operable to select an alternate communication path for replicated communication packets, based upon the voice quality parameters measured at the one or more of the network components.

22. The system of claim 20, further comprising:
a memory module associated with the voice quality system;
the processor being operable to determine potential alternative communication paths having improved voice quality with respect to a communication path being used for the communication session; and
wherein the memory module is operable to store the potential alternative communication paths for use during the communication session.

23. The system of claim 20, wherein the voice quality system further comprises a plurality of analyzers, each analyzer being operable to monitor the voice quality parameters at a respective one of the plurality of network components.

24. Logic encoded in media for selecting one of a plurality of network components to perform packet replication during a communication session, the logic operable to perform the following steps:
receive a first plurality of communication packets of a communication session between two endpoints, the packets being transmitted along a communication path including a plurality of network components;
monitor a performance parameter associated with the communication session at one of the two endpoints;
compare values of the performance parameter monitored at the one of the two endpoints, with a predetermined threshold value;
monitor the performance parameter at at least one of the plurality of network components, if the performance parameter monitored at the one of the two endpoints is below the threshold value; and
select one or more of the plurality of network components to perform packet replication along an alternate communication path, based upon the performance parameter monitored at the at least one of the plurality of network components.

25. The logic encoded in media of claim 24, wherein the logic is further operable to:
replicate a second plurality of communication packets of the communication session at the one or more of the plurality of network components; and
transmit the replicated communication packets along the alternate communication path.

26. The logic encoded in media of claim 24, wherein the logic is further operable to:
monitor the performance parameter at more than one of the plurality of network components; and
report results of the performance parameter monitoring at the more than one of the plurality of network components, to a voice quality system.

27. The logic encoded in media of claim 26, wherein the logic is further operable to:
assess an improvement in performance associated with transmission of the replicated communication packets along the alternate communication path; and
discontinue the transmission of the replicated communication packets along the alternative communication path, if the improvement in performance is below a predetermined minimum.

28. The logic encoded in media of claim 24, wherein the performance parameter is selected from the group consisting of jitter, dropped packets, and echo.

29. Logic encoded in media for adaptively improving voice quality during a communication session the logic operable to perform the following steps:
monitor voice quality parameters associated with a communication session at one or more network components of a communication network;
select at least one of the network components to perform packet replication if a value of the voice quality parameters deviates from a predetermined range;
transmit replicated packets from the selected at least one of the network components along an alternate communication path; and
wherein the alternate communication path is dynamically selected to achieve a voice quality value within the predetermined range, throughout the communication session.

30. The logic encoded in media of claim 29, wherein the voice quality parameters are monitored periodically throughout the communication session.

31. An apparatus for selecting one of a plurality of network components to perform packet replication during a communication session, comprising:
means for receiving a first plurality of communication packets of a communication session between two endpoints, and the communication packets being transmitted along a communication path including a plurality of network components;

means for monitoring a performance parameter associated with a communication session at one of the two endpoints;

means for comparing values of the performance parameter monitored at the one of the two endpoints with a predetermined threshold value;

means for monitoring the performance parameter at at least one of the plurality of network components if the performance parameter monitored at the one of the two endpoints deviates from the threshold value; and means for selecting one or more of the plurality of network components to perform packet replication along an alternate communication path, based on the performance parameter monitored at the at least one of the plurality of network components.

32. The apparatus of claim 31, further comprising:

means for replicating a second plurality of communication packets of the communication session at the one or more of the plurality of network components; and means for transmitting the replicated communication packets along the alternate communication path.

33. The apparatus of claim 31, further comprising:

monitoring the performance parameter at more than one of the plurality of network components; and reporting results of the performance parameter monitoring at the more than one of the plurality of network components, to a voice quality system.

34. The apparatus of claim 33, further comprising:

means for assessing an improvement in performance associated with transmission of the replicated communication packets along the alternate communication path; and means for discontinuing the transmission of replicated communication packets along the alternate communication path, if the improvement in performance is below a predetermined minimum value.

35. The apparatus of claim 31, wherein the performance parameter is selected from the group consisting of jitter, dropped packets, and echo.

36. An apparatus for adaptively improving voice quality during a communication session, comprising:

means for monitoring voice quality parameters associated with a communication session at one or more network components of a communication network;

means for selecting at least one of a network components to perform packet replication, if a value of the voice quality parameters deviates from a predetermined range;

means for transmitting replicated packets from the selected at least one of the network components, along an alternate communication path; and wherein the alternate communication path is dynamically selected to achieve a voice quality within the predetermined range, periodically throughout the communication session.

37. The apparatus of claim 36, wherein the voice quality parameters are monitored periodically throughout the communication session.

* * * * *